Patented June 26, 1934

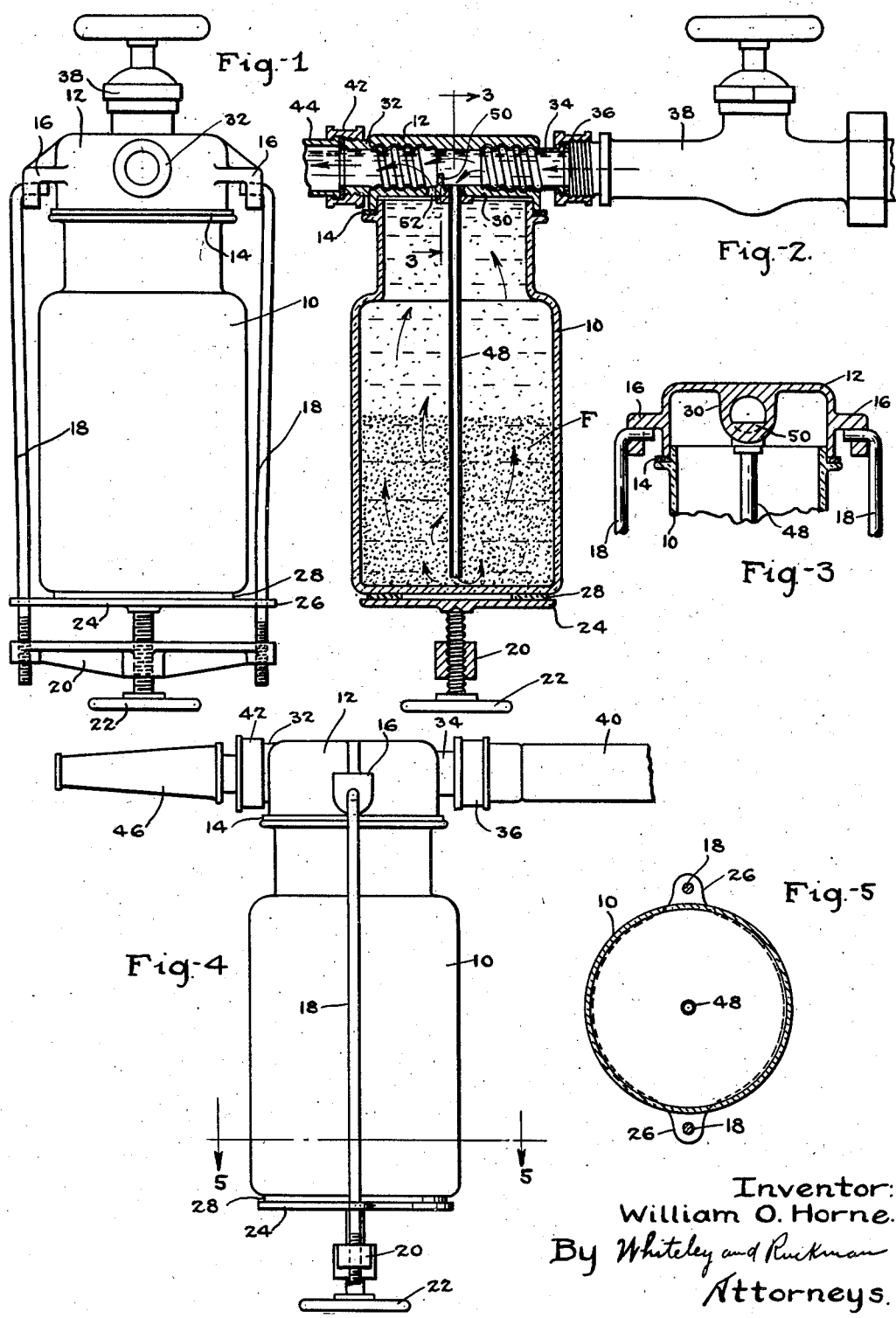
June 26, 1934.  W. O. HORNE  1,964,576
SPRINKLER DEVICE
Filed June 20, 1932
Inventor:
William O. Horne.
By Whiteley and Ruckman
Attorneys.

1,964,576

UNITED STATES PATENT OFFICE 1,964,576

SPRINKLER DEVICE

William O. Horne, Minneapolis, Minn., assignor of one-half to V. W. Brewer, Minneapolis, Minn.

Application June 20, 1932, Serial No. 618,172

2 Claims. (Cl. 299—84)

My invention relates to sprinkler devices, and more particularly to means associated therewith for dissolving soluble fertilizer and causing it to be gradually taken up and discharged along with a stream of water used for sprinkling lawns and gardens. An object of the invention is to provide a convenient device for this purpose which embodies a container for the soluble fertilizer in combination with means which diverts a portion of the stream of water from the usual supply thereof into the container, thereby gradually dissolving the fertilizer, and means which operates on the principle of an injector to cause the dissolved fertilizer to pass into the main stream and be delivered therewith through the nozzle.

The full objects and advantages of my invention will appear in connection with the detailed description thereof, and the novel features of my inventive idea will be particularly pointed out in the claims.

In the accompanying drawing which illustrates a practical embodiment of my invention,—

Fig. 1 is an elevational view of the device. Fig. 2 is a view in vertical section taken at right angles to Fig. 1. Fig. 3 is a view in section on the line 3—3 of Fig. 2. Fig. 4 is an elevational view showing a different manner of attaching the device in connection with a water supply. Fig. 5 is a view in horizontal section on the line 5—5 of Fig. 4.

Referring to the accompanying drawing, it will be observed that I provide a container 10, which may be a glass jar, and which is adapted to contain a considerable amount of soluble fertilizer designated F. The upper end of the container 10 is provided with a cap 12 whose lower margin seats upon a gasket 14 placed upon the neck of the container whereby a tight joint is made. The cap 12 at diametrically opposite points is provided with ears 16 in which upper inturned ends of rods 18 are pivotally mounted. The rods 18 converge slightly downwardly, and at their lower ends carry a crossbar 20. The downward convergence of the rods 18 serves to retain their upper ends in the ears 16 and yet does not interfere with the pivotal movement of said ends. A hand screw 22 passes through a threaded hole located centrally in the crossbar 20. The upper end of the screw 22 is adapted to engage the lower surface of a follower or support 24 having ears 26 slidably mounted on the rods 18. The bottom of the container 10 rests upon the follower 24 with an interposed gasket or resilient seat 28. Upon tightening the screw 22 the cap 12 will be held firmly down upon the upward end of the container 10. Upon lowering this screw so that the follower 24 may slide downwardly, the rods 18 may be rocked or turned to one side and the container 10 removed for receiving a fresh supply of fertilizer.

The cap 12 carries a horizontal tubular member 30, one end of which is provided with an externally threaded nipple 32 and the other end of which is provided with a flanged nipple 34. As shown in Fig. 2, these nipples are cast upon the ends of the tubular member 30, but it will be understood as a matter of course that they may be formed integrally with said member. The nipple 34 carries an internally threaded coupling 36 by means of which connection may be made to an ordinary water faucet 38, as shown in Fig. 2, or to the end of a garden hose 40 as shown in Fig. 4. The nipple 32 is adapted to be attached by a coupling 42 to the end of a garden hose 44, as shown in Fig. 2 or to the end of a nozzle 46, as shown in Fig. 4. This arrangement permits the device to be attached either close to the water faucet or at the further end of a hose whose inner end is attached to the faucet. A tube 48 at its upper end is threaded through the lower portion of the tubular member 30, while the lower end of the tube 48 is located adjacent the bottom of the container 10. Beyond the place of attachment of the tube 48 the tubular member 30 is provided with a dam 50 which consists of a projection extending up from the lower portion of said member and stopping considerably short of the upper portion thereof. Beyond the dam 50 the lower portion of the tubular member 30 is provided with a perforation 52.

The operation and advantages of my invention will be understood in connection with the foregoing description. The container 10 is filled to the desired extent with the desired soluble fertilizer, which may be any of the commercial fertilizers on the market. Connection is made in either of the ways previously described with the water supply used for sprinkling lawns and gardens. Upon turning on the water a large portion thereof passes straight through the tubular member 30 and out through the nozzle. A considerable portion, however, of the water is deflected by the dam 50 downwardly through the tube 48 to the bottom of the container 10. The suction of the main stream of water draws the fertilizing solution up through the perforation 52 to be carried out through the nozzle along with the main stream. The action is that of an injector and may be regulated according to the size of the perforation and the extent of the dam. In this manner the amount of fertilizer desired may be delivered to the lawns or garden in the best possible manner, that is, in a solution which is absorbed by the ground without wastage.

I claim:

1. A device for sprinkling lawns and gardens combining a wide-mouthed glass jar for holding soluble fertilizer, a gasket seated around the mouth of said jar below the upper end thereof, a cap adapted to fit over said upper end and rest upon said gasket, ears projecting from said cap at opposite sides thereof, rods having inturned ends at their upper portions fitting pivotally into said ears, a cross bar connecting the lower ends of said rods, a follower slidably carried by said rods and upon which said jar rests, a hand screw carried by said cross bar engaging the under surface of said follower for holding said cap tightly upon said gasket, said rods being capable of pivotal movement when said screw is loosened whereby said jar may be removed for receiving a fresh supply of fertilizer, a horizontal tubular member carried by said cap, means at one end of said member for connection with a water supply, means at the other end of said member for connection with a nozzle, a tube leading from said member to a position near the bottom of said jar, and means associated with said member acting as an injector to cause dissolved fertilizer to pass from the upper portion of said jar into the main stream of water passing through said tubular member.

2. A device for sprinkling lawns and gardens comprising a wide-mouthed glass jar for holding soluble fertilizer, a gasket seated around the mouth of said jar below the upper end thereof, a cap adapted to fit over said upper end and rest upon said gasket, ears projecting from said cap at opposite sides thereof, rods having inturned ends at their upper portions fitting pivotally into said ears, said rods being convergent downwardly for resiliently retaining said ends in said ears, a cross bar connecting the lower ends of said rods, a follower slidably carried by said rods and upon which said jar rests, a hand screw carried by said cross bar engaging the under surface of said follower for holding said cap tightly upon said gasket, said rods being capable of pivotal movement when said screw is loosened whereby said jar may be removed for receiving a fresh supply of fertilizer, a horizontal tubular member carried by said cap, means at one end of said member for connection with a water supply, means at the other end of said member for connection with a nozzle, a tube leading from said member to a position near the bottom of said jar, and means associated with said member acting as an injector to cause dissolved fertilizer to pass from the upper portion of said jar into the main stream of water passing through said tubular member.

WILLIAM O. HORNE.